UNITED STATES PATENT OFFICE.

WILLIAM A. BARNES, OF WORONOCO, MASSACHUSETTS.

METHOD OF WELDING COPPER.

No. 867,632.  Specification of Letters Patent.  Patented Oct. 8, 1907.

Application filed March 19, 1907. Serial No. 363,307.

*To all whom it may concern:*

Be it known that I, WILLIAM A. BARNES, a citizen of the United States, residing at Woronoco, in the county of Hampden and State of Massachusetts, have invented certain new and useful Improvements in Methods for Welding Copper, of which the following is a specification, reference being had therein to the accompanying drawing.

My invention relates to an improved flux or welding compound especially adapted for use in welding copper.

In the practice of my invention I provide a flux in which sand, glass, copper filings, borax, and cyanid of potassium are employed, and these ingredients are preferably used in the following proportions, namely, fine quartz sand 2 parts, pulverized glass 2 parts, soft copper filings 2 parts, borax 8 parts, and cyanid of potassium 2 parts, these parts being determined and apportioned by weight in order to produce the most desirable and effectual result. The ingredients are reduced more or less to a powdered state and thoroughly and effectually mixed, preferably by being placed together in a mortar and ground with a pestle, although it will be obvious that various other manners of mixing and pulverizing will produce the same result.

While the ingredients herein named are preferably mixed in the dry form, as hereinbefore set forth, it is obvious that they may be placed in a crucible together and heated to a degree of temperature sufficient to reduce to a molten condition and then thoroughly stirred to more completely mix said ingredients. The mixture may then be allowed to cool and harden and, when hardened or fixed it will, of course, assume a brittleness which would be the natural result of the combination of such substances, whereupon it may be reduced by grinding or pounding to a powdered or pulverized form.

The pieces of copper to be welded are first properly shaped and then heated to the required temperature. During the heating process the copper is kept covered by the foregoing described flux until white flakes begin to appear on the metal, and as it is then of the proper heat for welding, it is hammered, the blows being quick and light at the commencement and then gradually increasing in force until the desired result is obtained.

While, as above stated, my improved flux is especially adapted for welding copper, it may be used for welding other metal.

Having thus described my said invention, what I claim as new and desire to secure by Letters Patent of the United States, is

1. The herein described flux or welding compound consisting of sand, copper filings, glass, borax and cyanid of potassium.

2. The herein described flux or welding compound consisting of sand, two parts; glass, two parts; copper filings, two parts; borax, eight parts and cyanid of potassium, two parts, substantially as described.

In testimony whereof I hereunto affix my signature in presence of two witnesses.

WILLIAM A. BARNES.

Witnesses:
 V. W. CROWSON,
 C. R. BARBER.